(12) United States Patent
Vijayasankar et al.

(10) Patent No.: US 10,064,218 B2
(45) Date of Patent: Aug. 28, 2018

(54) CHANNEL HOPPING AWARE CHANNEL ACCESS AND RE-TRANSMISSION

(71) Applicant: Texas Instruments Incorporated, Dallas, TX (US)

(72) Inventors: Kumaran Vijayasankar, Allen, TX (US); Jyothsna Kunduru, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/450,644

(22) Filed: Mar. 6, 2017

(65) Prior Publication Data

US 2018/0027588 A1    Jan. 25, 2018

Related U.S. Application Data

(60) Provisional application No. 62/364,227, filed on Jul. 19, 2016.

(51) Int. Cl.

| H04L 12/413 | (2006.01) |
| H04W 74/08 | (2009.01) |
| H04W 4/80 | (2018.01) |
| H04B 1/713 | (2011.01) |
| H04L 5/00 | (2006.01) |

(52) U.S. Cl.
CPC ........ H04W 74/0808 (2013.01); H04B 1/713 (2013.01); H04L 5/0012 (2013.01); H04L 5/0055 (2013.01); H04W 4/80 (2018.02); H04W 74/085 (2013.01)

(58) Field of Classification Search
CPC . H04W 74/0808; H04W 4/80; H04W 74/085; H04B 1/713; H04L 5/0012
USPC ................ 370/445, 447, 448, 450, 454, 461
See application file for complete search history.

(56) References Cited

U.S. PATENT DOCUMENTS

| 9,537,688 | B2 * | 1/2017 | Merlin ............... H04W 74/0808 |
| 2016/0344443 | A1 | 11/2016 | Vijayasankar et al. |
| 2017/0164409 | A1 * | 6/2017 | Kim .................. H04W 74/0833 |

* cited by examiner

*Primary Examiner* — Brenda H Pham
(74) *Attorney, Agent, or Firm* — Gregory J. Albin; Charles A. Brill; Frank D. Cimino

(57) ABSTRACT

A method of channel access for a radio device in an asynchronous channel hopping wireless network. A backoff time is set from an Interference Avoidance Delay plus a random backoff time for transmissions from the radio device. For initial frame transmissions, an initial value for a number of backoffs (nb) and initial number of preamble detection backoffs (npdb) is set. After waiting for expiring of the initial backoff time and provided a current npdb_value <a predetermined maximum npdb value, a first CCA is performed on the radio device's receive (Rx) channel, and a value for npdb is incremented following a failure. A second CCA is performed on a target radio device's Rx channel, wherein a value for nb is incremented following a failure. Provided a not busy is determined in the second CCA the radio device transmits a frame on the target radio device's Rx channel.

20 Claims, 4 Drawing Sheets

CHANNEL HOPPING AWARE CHANNEL ACCESS AND RE-TRANSMISSION

CROSS REFERENCE TO RELATED APPLICATIONS

This application claims the benefit of Provisional Application Ser. No. 62/364,227 entitled "Channel Hopping aware Channel Access and Retransmission Mechanism", filed on Jul. 19, 2016, which is herein incorporated by reference in its entirety.

FIELD

Disclosed embodiments generally to wireless networks, and more particularly to asynchronous (un-slotted) channel hopping in such networks.

BACKGROUND

Institute of Electrical and Electronics Engineers (IEEE) 802.15.4e is an enhanced media access control (MAC) layer protocol of the IEEE 802.15.4 standard designed for low power and low data rate networks. The IEEE 802.15.4e architecture is defined in terms of a number of blocks in order to simplify the standard. These blocks are called layers. Each layer is responsible for one part of the standard and offers services to the higher layers. The interfaces between the layers serve to define the logical links that are described in the standard. A low-rate (LR)-wireless personal area network (WPAN) device comprises at least one PHY (physical layer), which contains the radio frequency (RF) transceiver (or radio) along with its low-level control mechanism, and a MAC sublayer that provides access to the physical channel for all types of transfers. The radio device can either transmit or receive at any given time, but cannot simultaneously perform both transmitting and receiving.

IEEE 802.15.4e is suitable for sensor devices with resource constraints; e.g., low power consumption, low computation capabilities, and low memory. As sensors and actuators that are interconnect by a PAN in home and office environments become more common, limiting power dissipation for each device is important. Some radio devices may operate on a battery, in which case frequent battery changes or recharges are undesirable. Some other radio devices may operate on a limited amount of power that is generated by the device itself such as using conversion from solar or other light sources, energy scavenging from motion or thermal effects, or collection of energy from ambient electromagnetic fields.

Channel hopping wireless transmission system protocols typically have a retransmission mechanism to retransmit lost frames. When channel hopping is used, subsequent transmissions can use a different channel (frequency band) in the channel hopping sequence. This helps avoid channel interference that may have existed in the previous channel used causing frame loss so that channel hopping can improve network capacity. Channel hopping achieves increased network throughput by promoting simultaneous data transfer over multiple channels between different pairs of radio devices, or to achieve reliability in tough channel conditions by exploiting channel diversity.

Channel hopping can be achieved through many different known methods, with the most common methods used being either a synchronous method called Time Slotted Channel Hopping (TSCH) or an asynchronous method called un-slotted channel hopping as defined in the IEEE 802.15.4e standard. Many standards also exist that use a channel hopping MAC to define MAC protocols for different applications. Standards also exist that use a channel hopping MAC to define MAC protocols for different applications. For example the Wi-SUN™ Alliance has published a Field Area Network (FAN) specification that specifies how to use asynchronous channel hopping for smart grid applications (Technical Profile Specification Field Area Network, Wi-SUN Alliance 2014, hereafter the "Wi-SUN FAN").

In asynchronous channel hopping (which does not require any synchronization for channel hopping) MACs, such as the one defined in the Wi-SUN FAN, each radio device maintains its broadcast schedule as well as a unicast schedule. The radio device will transmit its broadcast data during its broadcast schedule and its neighboring radio devices who are already tracking this radio device are expected to be listening in its channel during the broadcast slot. During the broadcast interval, the radio devices follow their own receiver directed unicast channel hopping schedules. Being asynchronous channel hopping, the unicast channel hopping slots need not be synchronized to each other.

The unicast schedules are receiver directed in the sense that a radio device transmits the frame in the receiver radio device's channel using carrier sense multiple access with collision avoidance (CSMA/CA). If the frame's data transmission goes beyond the slot period then the transmitting radio device continues the data transmission into the adjacent slots of the receiver radio device as well. For example, responsive to a data request received from a radio device B, a radio device A may transmit a frame in radio device B's Rx channel and the data transfer from radio device A may extend into the adjacent time slot. The channel hopping information is exchanged between the respective radio devices A and B through the transfer of special information elements as disclosed in the Wi-SUN FAN.

TSCH uses dedicated/shared time slots for radio devices and thus the devices do not need to have a complex channel access procedure. Asynchronous channel hopping on the other hand needs a channel access mechanism to transmit frames because the radio devices can transmit frames at any time. However, known asynchronous access mechanisms do not take into account the presence of interference that may be present at certain random times on some channels.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known asynchronous channel access mechanisms for MAC do not effectively take into account a channel hopping system. For example, the Wi-SUN FAN includes modes of channel access used in its direct frame exchange (DFE) and extended directed frame exchange (EDFE) access methods. DFE follows the IEEE 802.15.4 CSMA/CA scheme for channel access for a network operating on a single channel. Thus, when channel access fails on a single channel in DFE the frame transmission is deemed a failure even without attempting transmission of the frame on another channel. When retransmissions are used to try to retransmit lost frames (e.g., frames for which an ACK was not received), the corresponding random 'backoff' delay time used (as per IEEE 802.15.4 specification), with the backoff time being the amount of time the radio device postpones (waits) before attempting to transmit a frame to a target device, does not ensure or make likely that the retransmitted frame uses a different channel. Thus in most cases the channel access mechanism in DFE does not exploit the benefits of a channel hopping system.

In the EDFE method the channel access mechanism uses an additional constant delay time (added to the backoff time) when the radio device goes into a retransmission such as when clear channel assessment (CCA) fails, or when no ACK is received from the target radio device. This additional constant delay time does not necessarily result in operation in a different channel so that channel hopping may not be exploited. The EDFE method does allow for parallel backoff times (two parallel timers can be run, one for each radio device that can have different backoff times) to different devices. The EDFE despite being applicable for a network operating on multiple channels and sometimes exploiting channel hopping, is still recognized to have the following two (2) significant shortcomings:

1. The EDFE does not account for potential frames being sent to the radio device on its Rx channel for which the preamble has not yet been detected. This is because the EDFE does not require performing a CCA on the Rx channel before switching to the Tx channel for transmission.

2. The constant additional backoff time used does not necessarily exploit channel diversity of different devices as described above.

Disclosed channel hopping aware channel access and retransmission mechanisms for asynchronous channel hopping networks handles interference and exploits channel diversity. This is accomplished by setting a backoff time (whether a first transmission or a retransmission after a transmission failure) that comprises an Interference Access Delay (IAD), which is generally zero for a first transmission and is a variable that is incrementable for retransmissions, which is added to a random backoff part to provide the current backoff time used. The IAD for retransmissions is incremented differently based on the type of channel access failure.

BRIEF DESCRIPTION OF THE DRAWINGS

Reference will now be made to the accompanying drawings, which are not necessarily drawn to scale, wherein.

DETAILED DESCRIPTION

Figure 1:
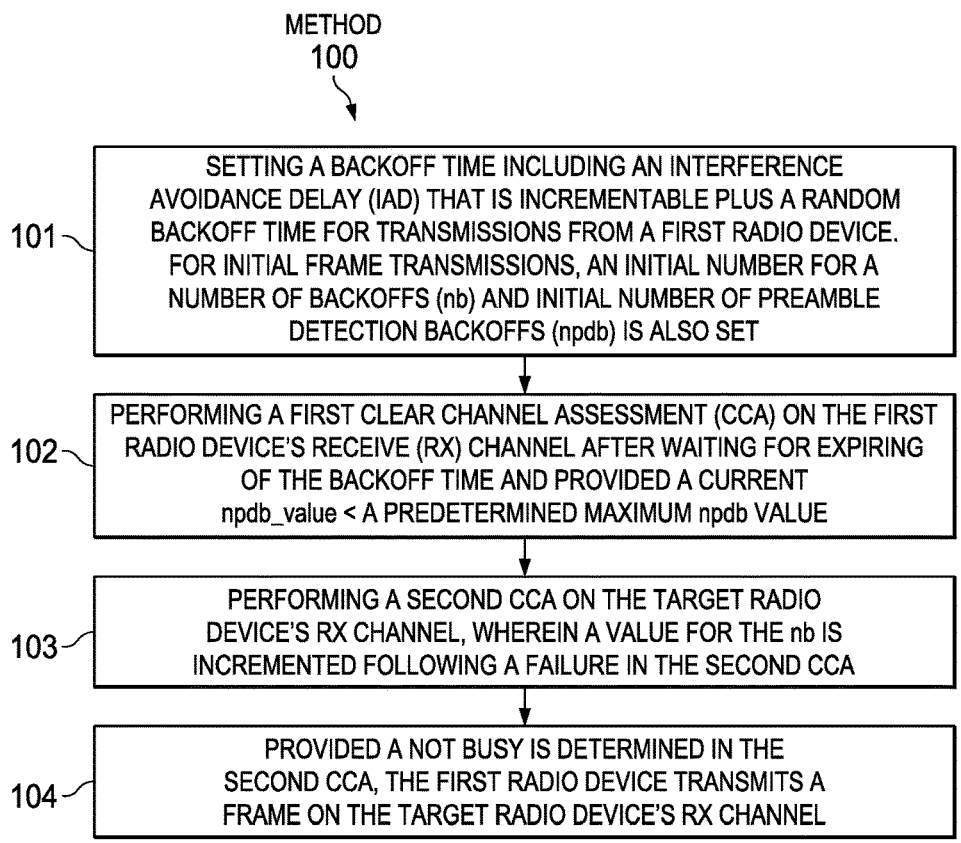
FIG. 1 is a flow chart that shows steps in an example method of channel hopping aware channel access and retransmission for an asynchronous channel hopping network, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of channel hopping aware channel access and retransmission in an asynchronous channel hopping wireless network, according to an example embodiment. Step 101 comprises setting a backoff time including an IAD that is incrementable in the case of a channel access failure plus a random backoff time for transmissions from a first radio device. For initial frame transmissions, an initial value for a number of backoffs (nb) and initial value for a number of preamble detection backoffs (npdb) is also set, that are both generally initially set to zero. The IAD for a first transmission is also generally set to zero, while for retransmission it is set to >0, such as ½ the target dwell time (TDT) in FIG. 2 described below or a basebackoff time equal to a remaining target dwell time (TDT)*nb in FIG. 3 described below. The TDT (which may also be referred to as a broadcast interval) as used herein is the total length of time a radio device remains on a given channel.

Step 102 comprises performing a first CCA on the first radio device's receive (Rx) channel after waiting for expiring of the backoff time, provided a current npdb_value <a predetermined maximum npdb value. A value for npdb is incremented (e.g. using a counter at the first radio device) following a failure of the first CCA that is used in the case of a planned retransmission by the first radio device.

Step 103 comprises performing a second CCA on the target radio device's Rx channel, wherein a value for the nb is incremented (e.g. using a counter) following a failure in the second CCA that is used in the case of an attempted retransmission by the first radio device. In step 104, provided a not busy is determined in the second CCA, the first radio device transmits a frame to the target radio device on the target radio device's Rx channel.

The transmitting can comprise a retransmission which is delayed by the IAD sufficiently so that the retransmission on the target radio device's Rx channel is on a different channel as compared to a channel used for a most recent transmitting attempt by the first radio device. Setting IAD=TDT/2 (see step 202 in method 200 in FIG. 2 described below) is one example which implements the concept of only 1 attempted retransmission that once one waits for the TDT to elapse, the target radio device will move into a new TDT. In the next TDT, the target radio device is likely to end up on a different channel, so that as long as new transmission attempts by the first radio device are made during the new dwell time, channel diversity will be accomplished.

The backoff time utilized for retransmissions includes an incrementable IAD value. The current IAD value is determined based on the type of channel access failure.

Regarding the first and second CCA steps (102, and 103, respectively), consider two radio devices transmitting a frame to each other. If both radio devices pick the same random number for their backoff times then the frames will collide. However, when the respective radio devices pick adjacent channels then the transmission from the radio device with the shorter backoff time should succeed while the radio device with the longer backoff time should detect such transmission and in response backoff. This arrangement works with a single channel system where a single CCA is performed on the receiver device's Rx channel.

However, in channel hopping networks that disclosed embodiments apply, the receiver's Rx channel may not be the same as that of the transmitter's Tx channel. Thus only performing the second CCA on a target radio device's Rx channel can fail to detect a frame on an incoming channel. Thus it is recognized it is needed to perform both a first CCA on the first radio device's Rx channel (step 102) and a second CCA on the target radio device's Rx channel (step 103) before the first radio device transmits a frame to the target radio device.

However such a dual-CCA method can also suffer from the case where there is interference on the first radio device's Rx channel but there is no interference on the target radio device's Rx channel. In this case the first radio device may refrain from transmission when it could have actually sent the frame successfully. To handle this case an additional safety mechanism is disclosed of not doing this by checking the Rx channel before switching to the Tx channel for more than a predetermined number of preamble detection attempts specified as a maximum npdb (having a recommended value=2) which should be lower than the maximum allowable number of CCA attempts can be used. This will enable the first radio device from avoiding potential interference on its Rx channel from blocking a successful transmission on the target radio device's Rx channel.

If there is a busy generated failure on the first CCA (step 102), either a frame is currently being received or that there is interference present on the first radio device's Rx channel above a threshold power level on that channel. If a frame is currently being received then the frame should be detected after a preamble detection time (PDT) in which case the first radio device continues into frame listening mode. In this case, the channel access can be paused until the frame is received and then resume the channel access procedure.

If on the other hand there is a first CCA failure due to interference, then further transmission on this channel will also result in a failure. Since the actual cause of interference cannot be known, the IAD can be set to a maximum PDT value. (See step 215 in method 200 described below). The number of first CCA failures can be kept track of with a counter using the variable npdb described above that is not reset (reset meaning setting to zero) due to any specific channel access attempts. The npdb value can be a global value defined herein as a value that is retained across multiple channel access attempts. The npbd value can also be reset (setting npdb back to 0) each time the radio device changes its Rx channel or a preamble is detected successfully on that Rx channel.

A second CCA failure on the target radio device's Rx channel (step 103) indicates some radio device is currently transmitting a valid frame on that channel, or that that channel is having interference. If a frame is being transmitted on the target device's Rx channel then the backoff time for that frame is delayed until the frame is transmitted.

If on the other hand the second CCA failure on the target radio device's Rx channel/first radio device's Tx channel is caused due to interference, then a further transmission on this channel will be a failure. Since the actual cause of interference cannot be known, the IAD can be set to =a maximum expected frame transmission time. See step 214 in method 200 described below which is shown calculated as a max (expected frame transmission time, TDT). The IAD can thus account for the TDT. This is because when the target radio device is channel hopping it moves to a new time slot after its TDT has elapsed, and thus will move to a different channel. The next transmission attempt from the first radio device is thus guaranteed to use a different channel thus exploiting channel diversity.

The expected frame transmission time can be set to a value based on the expected traffic profile. If the value of the frame transmission is not known it can be set to the maximum frame transmission time. If it is not intended to be used for an application, then it can be set to the TDT so that it does not affect the IAD computation.

If access to a channel is available (CCA is not busy) and a frame from which a MAC level acknowledgement (ACK) is expected to be transmitted to the destination device, the transmitting radio device waits for an ACK timeout to wait for an ACK from the destination device. If an ACK is not received in the timeout period, then it is considered as a no ACK situation. When an ACK is not received it can be because of a collision at destination device or interference at the destination device. Since the actual cause of a no ACK generally cannot be known, the IAD can be set to TDT/2 by returning to step 201 after step 223 (by marking the frame for retransmission) in FIG. 2B to enable starting a frame to enable 1 more transmission attempts in the same channel before moving to a new TDT and thus a new channel. An IAD equal to TDT/2 (shown as step 202 in FIG. 2A described below) allows for another transmission attempt on same channel (in case the loss was due to a collision), or a change of channel in two transmission attempts to exploit channel diversity if the frame loss was due to interference.

Figure 2A:
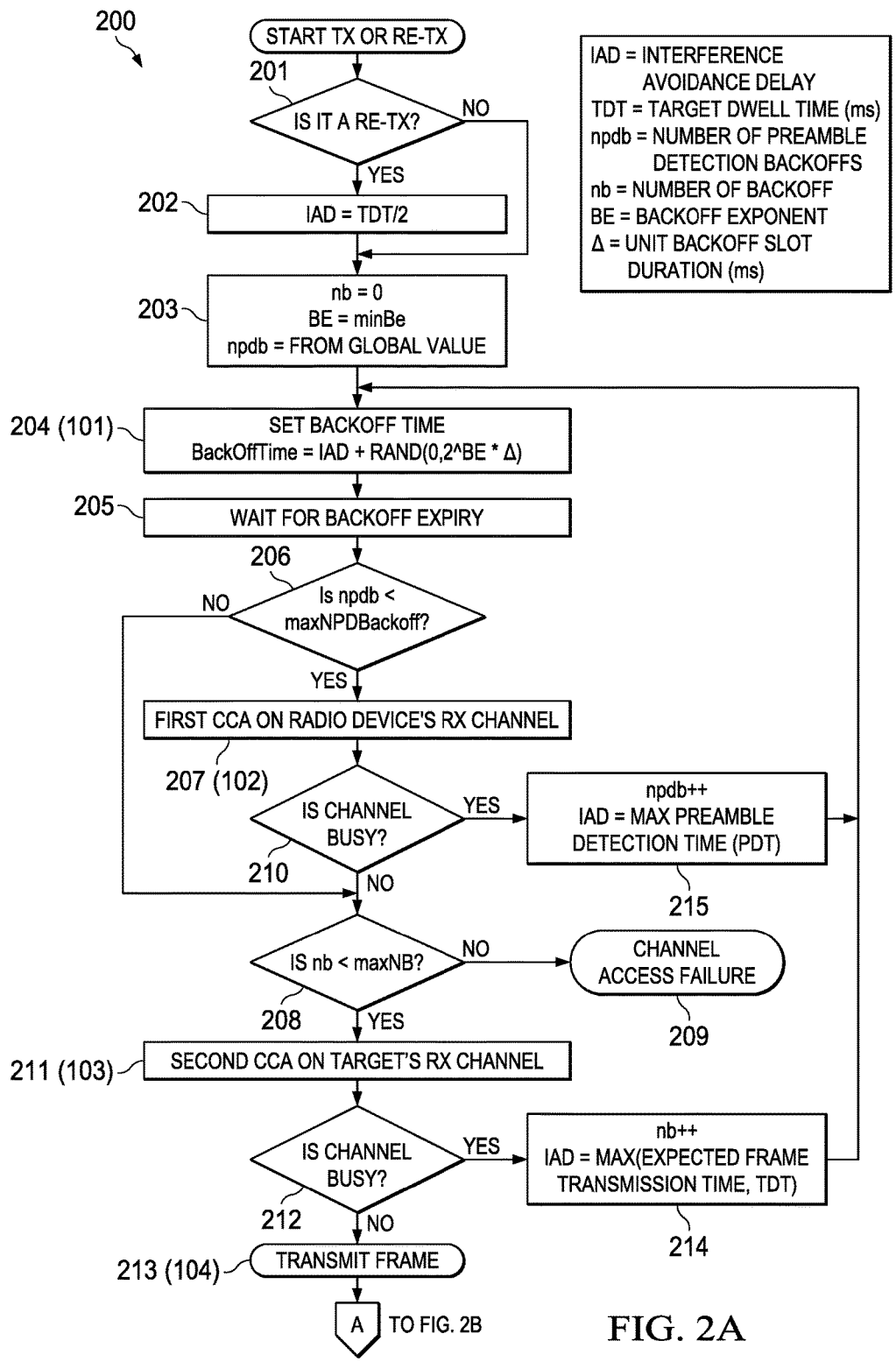
FIGS. 2A and 2B provide a detailed flow chart that shows steps in another example method of channel hopping aware channel access and retransmission for an asynchronous channel hopping network, according to an example embodiment.
Figure 2B:
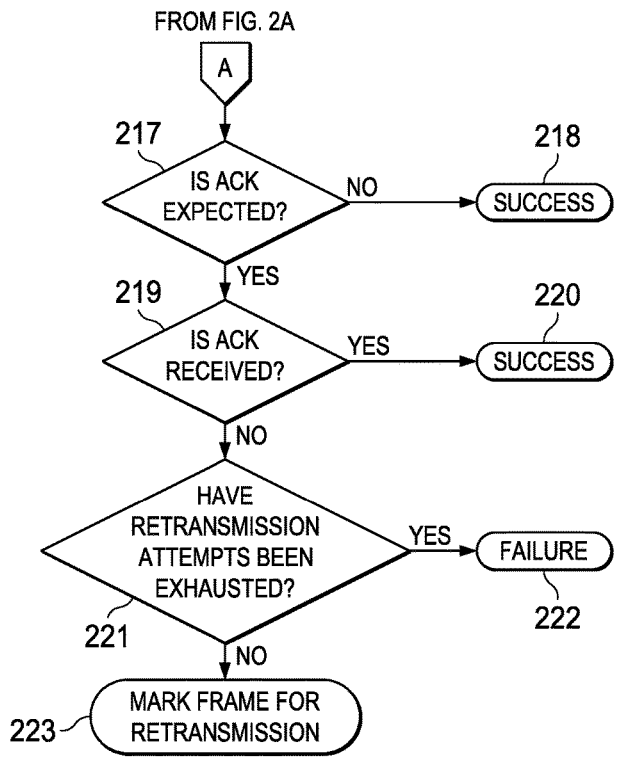

FIGS. 2A and 2B provide a detailed flow chart that shows steps in a more detailed example method 200 of channel hopping aware channel access and retransmission in an asynchronous channel hopping wireless network, according to an example embodiment. Equivalent steps in method 100 are shown in parenthesis. Step 201 comprises determining whether the pending transmission for a first radio device is a transmission or a retransmission. If the pending transmission is a retransmission (i.e., following the transmitting of lost frames) step 202 is reached where the IAD value is set to TDT/x, where x is an integer to ensure after x attempts on same channel a new channel is attempted, where TDT/2 (x=2) is what is shown in FIG. 2A. The goal in this step as described above is to perform no more than a specific number of transmission attempts (2 in this case) after which a new channel (as the TDT should be crossed) should be attempted, otherwise (for a planned initial transmission) step 203 is reached directly from step 201. Step 203 comprises setting initial backoff time parameters that include at least setting the nb to 0, the backoff exponent (BE) to a minimum BE, and the setting a value for the npdb shown from a global value that may be zero. As described above the npdb is a variable that keeps track of the number of first CCA failures on the radio device's Rx channel (see a "busy" condition failure at step 210 described below).

Step 204 comprises setting a backoff time calculated from the backoff parameters using an equation such as the backoff time equation shown as backofftime=IAD+Rand(0, $2^{BE*\Delta}$), where Rand stands for random which is described in the Wi-SUN FAN, and the IAD term is a disclosed new term for determining the backoff time. Regarding the operation of the term Rand(0, $2^{BE*\Delta}$), $\Delta$ is the unitBackoff slotDuration which is a time value set by the Wi-SUN FAN ($\Delta$=1 ms in one embodiment). Randomness is utilized to reduce contention between devices. As described below the IAD value is determined for a planned transmission attempt by step 214 and 215 depending on the particular CCA failure. Step 205 comprises waiting for the backoff time to expire before reaching step 206.

Step 206 comprises determining whether the current npdb value (set in step 203 for an initial transmission or in step 215 for a retransmissions) is <a maximum npdb value. If yes (npdb <maximum npdb) in step 206, step 207 is reached where a first CCA is performed on the radio device's Rx channel (step 102 in method 100), then it is determined in step 210 whether the radio device's Rx channel is busy. If in step 210 it is determined the Rx channel is not busy, step 208 is reached. If the npdb is determined to not be <maximum npdb in step 206, step 208 is also reached.

In step 208 it is determined whether the current nb value <a maximum nb value. If nb is ≥maximum nb, step 209 is reached which is a channel access failure, otherwise step 211 comprising performing a second CCA on the target radio device's Rx channel (step 103) is reached with the second CCA results obtained being evaluated in step 212.

If the target device's Rx channel is not busy, step 213 is reached comprising the first radio device transmitting the frame to the target radio device on the target radio device's current Rx channel. If the target device's Rx channel is found to be busy in step 212 (a second CCA failure), step 213 is reached comprising incrementing the nb to a new nb value shown as nb++, and where the IAD is now set to a maximum of (the expected frame transmission time, and TDT) before returning to step 204. When the target's Rx channel is busy, either a frame is being transmitted or the channel has interference. Unlike the single channel case, the first radio device cannot wait on that channel to determine the reason for the channel busy. Accordingly, to be safe, in step 214 the first radio device selects the maximum of the expected frame transmission time and the TDT as shown and then performs a backoff. Meanwhile, the first radio device continues its Rx on its own channel.

If it is determined in step 210 that the first radio device's Rx channel is busy, step 215 is reached comprising increasing the npdb value to a new npdb value shown as npdb++, where the IAD is now set to a maximum preamble detection time. This is the case where the first radio device's Rx channel is busy evidencing that some device may be transmitting a frame to it. So the first radio device should try to accept that frame by waiting for the PDT to see if it is a valid frame before returning to step 204.

If in step 213 (step 104) the first radio device transmits the frame to the target radio device on the target radio device's current Rx channel, step 217 is reached which determines whether an ACK is expected from the target radio device. If no ACK is expected (a frame can be sent as a broadcast or unicast with no ACK expected, where an ACK is added for reliability if the application wants to), step 218 is reached shown as a successful communication. If an ACK is expected, step 219 is reached comprising determining whether an ACK was received. In step 219 if it is determined the expected ACK was received by the first radio device, step 220 is reached shown as a successful communication.

In step 219 if it is determined the expected ACK was not received by the first radio device, step 221 is reached which comprises determining whether a maximum number of allowed retransmission attempts have been exhausted. For example, this can be accomplished by comparing the number of retransmission attempts to a maximum RetransmissionLimit (part of the Wi-SUN FAN). If the number of retransmission attempts have been exhausted, step 222 is reached being a communication failure. If the number of retransmission attempts have not been exhausted, step 223 is reached comprising marking the frame for retransmission, then returning to step 201.

Figure 3B:
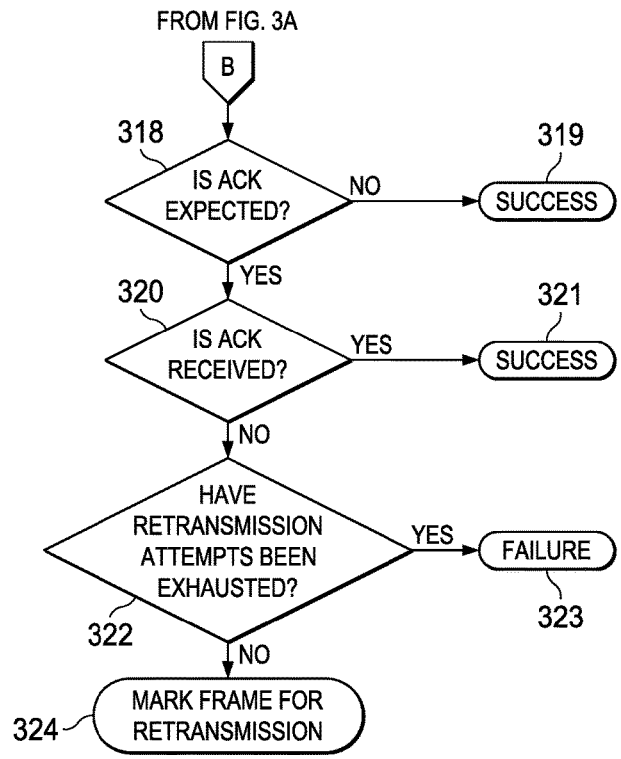
FIGS. 3A and 3B provide a detailed flow chart that shows steps in another example method of channel hopping aware channel access and retransmission for an asynchronous channel hopping network, according to an example embodiment.
Figure 3A:
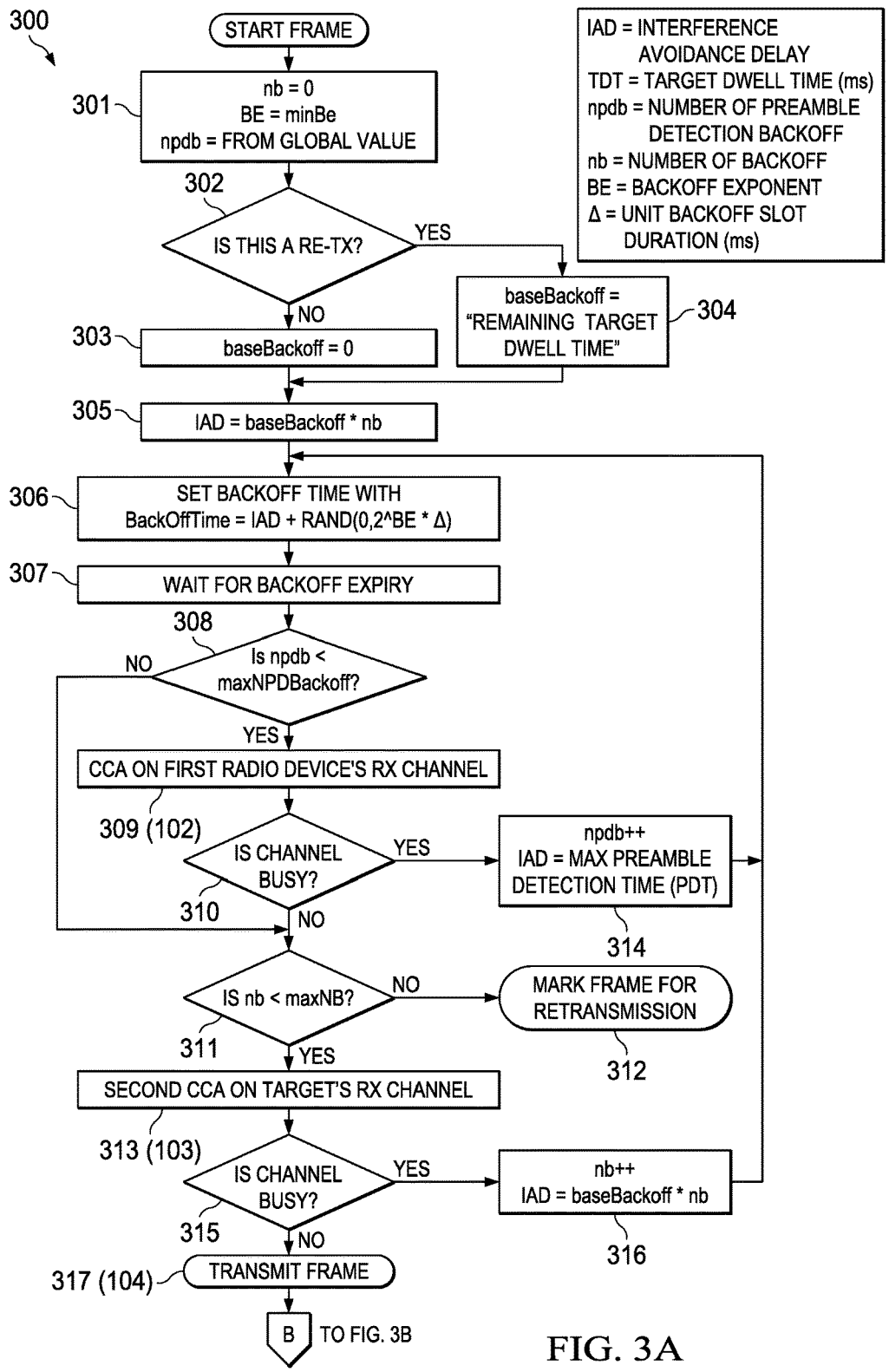

FIGS. 3A and 3B provide a detailed flow chart that shows steps in another example method 300 of channel hopping aware channel access and retransmission for an asynchronous channel hopping network, according to an example embodiment. This embodiment resembles method 200 but calculates IAD differently (in step 304) by setting the IAD=a constant shown as a "basebackoff" that is multiplied by nb which is incrementable. The basebackoff is equal to a remaining TDT. Equivalent steps in method 100 are again shown in parenthesis.

Step 301 follows starting the frame and comprises setting initial backoff time parameters that include setting the nb to 0, the BE to a minimum BE, and the setting of an npdb value (shown from a global value; which as described above means this value is maintained between different independent attempts to transmit different frames). Step 302 comprises determining whether the pending transmission for the first radio device is a transmission or a retransmission. If the pending transmission is not a retransmission step 303 is reached where the basebackoff value is set to 0, otherwise step 304 is reached which sets the basebackoff time to the remaining TDT. Step 305 is reached by both steps 303 and 304 which comprises setting the IAD=basebackoff*nb.

Step 306 comprises setting a backoff time shown calculated from a term from the equation in the Wi-SUN FAN described above (Rand(0,$2^{BE*\Delta}$)) plus another term being the IAD. Step 307 comprises waiting for the backoff time to expire before reaching step 308.

Step 308 comprises determining whether the current npdb value (set in step 301 or step 314 for a retransmission) is <a maximum npdb value. If yes (npdb <maximum npdb) in step 308, step 309 is reached where a first CCA is performed on the radio device's Rx channel (step 102 in method 100), then it is determined in step 310 whether the radio device's Rx channel is busy. If in step 310 it is determined the Rx channel is not busy, step 311 is reached which checks whether nb<max Nb. If nb is not <max Nb, the frame is marked for retransmission in step 312 and the method returns to start frame then step 301 where a retransmission is attempted. If nb is <the max Nb, step 313 is reached comprising performing a second CCA on the target radio device's Rx channel (step 103), with the second CCA results obtained being evaluated in step 315. If in step 310 it is determined the first radio device's Rx channel is busy, step 314 is reached which comprises increasing the npdb value to a new npdb value shown as npdb++, where the IAD is now set to the basebackoff*nb, and the method as shown returns to step 306.

If in step 315 it is determined the target radio's Rx channel is busy, step 316 is reached which comprises incrementing the nb value (shown as nb++), and then setting the IAD=basebackoff*nb, then returning to step 306. If in step 313 it is determined the target device's Rx channel is not busy, step 317 (104) is reached comprising the first radio device transmitting the frame to the target radio device on the target radio device's current Rx channel.

After the frame is transmitted to the target radio device in step 317, step 318 is reached which determines whether an ACK is expected from the target radio device. If no ACK is expected, step 319 is reached shown as a successful communication. If an ACK is expected, step 320 is reached comprising determining whether an ACK was received. In step 320 if it is determined the ACK was received by the first radio device, step 321 is reached shown as a successful communication. In step 320 if it is determined the ACK was not received by the first radio device, step 322 is reached which comprises determining whether the maximum number of allowed retransmission attempts have been exhausted. As described above this can be accomplished by comparing the number of retransmissions to a maximum RetransmissionLimit (part of the Wi-SUN FAN). If the maximum number of retransmission attempts have been exhausted, step 323 is reached being declared a communication failure. If the maximum number of retransmission attempts have not exhausted, step 324 is reached comprising marking the frame for retransmission, then returning to step 301.

There are also disclosed optional features referred to herein as variants. A first variant, variant 1, comprises channel access to multiple target device destinations. It is noted that channel access to multiple different target device destinations can be performed in parallel (at the same time, each backoff timer running in parallel) as the channel error for different devices can be different based on their particular Rx channel used at that given time. In this case individual counters at each radio device are used, such as for independently (separately) counting nb and counting the number retransmission attempts, meaning a change in value for one frame for one device should not affect the another device's frame transmission attempt.

Npdb as described above is a parameter that is related to node's own CCA (first CCA as described above) and hence it should be common for all these transmission attempts meaning a change in value of the npdb by one attempt will affect the other. For different radio devices the npdb value can be kept separately on a per radio device destination basis. It is not recommended to run parallel backoffs for different frames corresponding to the same radio device destination. However, in this case the npdb value can be kept global meaning the last value of npdb is retained as a start value for next attempts even when the backoff's are taken for different destinations as the first radio device's Rx channel does not differ per radio device destination.

A second variant comprises using a variable npdb value which can be reset per channel access. Instead of starting the npdb from a global value (the value last used for this variable), the npdb value can be started with a 0 at step 301 which follows starting a frame. As described above npdb refers to a variable which is incremented when the first radio device's Rx channel is observed to be busy (a first CCA failure). For a given frame, a maximum number of npdb attempts are made before ignoring any further failures on first radio device's Rx channel. As described above, it is disclosed that the maximum number of npdb attempts is not reset to 0 per frame, which means, say one has two frames, frame 1 and frame 2, and when transmitting each of them npdb was incremented, so it is at 2, a possible maximum possible value for the number of npdb attempts to be used. When transmitting frame 3, no further attempts will be made. This variable is disclosed above to be zero only when a preamble is detected. In this second variant, a maximum npdb attempts is set to 0 before taking a frame for channel access, meaning results of frame 1 do not affect frame 2's transmissions. An advantage of this second variant is handling situations where the inter packet delay is higher as the channel could have changed in the meantime. Also this second variant has the advantage of being less complex to implement.

A third variant is to always use an IAD=TDT and sets the maximum nb value to 1. The BE can be incremented even for different retransmission attempts of the same frame. An advantage of this third variant is that it always ensures a new channel is picked up for a retransmission.

Figure 4:
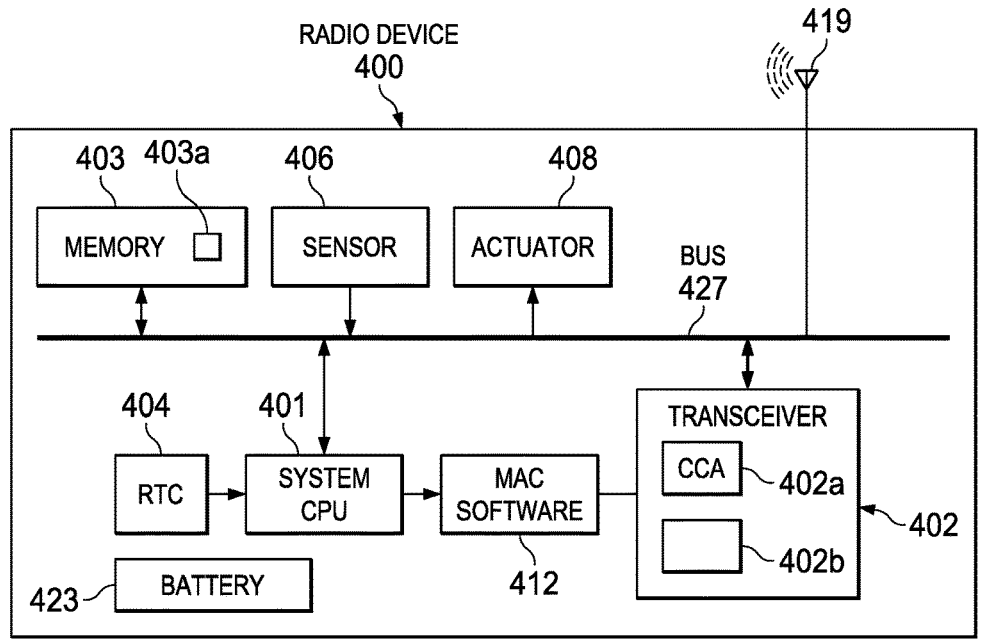
FIG. 4 shows the components of an example wireless radio device that includes code for implementing a disclosed channel hopping aware channel access and retransmission algorithm or hardware for implementing the algorithm for operating in an asynchronous channel hopping network, according to an example embodiment.

FIG. 4 shows the components of an example wireless radio device 400 that includes code 403a for implementing a disclosed channel hopping aware channel access and retransmission algorithm or hardware including digital logic 402b for implementing the channel hopping aware channel access and retransmission algorithm shown within the transceiver 402. Although both code 403a and hardware including digital logic 402b are shown in FIG. 4, only one of these is needed.

Radio device 400 is shown including a system processor (shown as system central processing unit (CPU)) 401 that includes a nonvolatile memory 403 (e.g., static random-access memory (SRAM)) for holding instructions (code) and data. Nonvolatile memory 403 may store software program instructions that may be executed by the system CPU 401 and/or the transceiver 402 to perform some or all of the network functions described herein, for example code 403a for running the channel hopping aware channel access and retransmission algorithm. Radio device 400 is also shown having a MAC software block 412 where its function may be performed by software executed on the system CPU 401. Radio device 400 is shown powered by a battery 423. One or more sensors 406 and/or one or more actuator circuits 408 may be included in radio device 400 for interacting with the physical world.

A bus 427 couples together the respective components of radio device 400. Transceiver 402 is coupled to the antenna 419. Transceiver is shown including a CCA block 402a that generally comprises at least one comparator. A real-time clock (RTC) 404 is included in radio device 400 that is provided to the system CPU 401.

Disclosed subject matter can be used in a variety of applications. One application has a plurality of disclosed radio devices including a sensor 406 or an actuator 408. In this embodiment the channel hopping wireless communications network is part of a smart grid that can comprise an electricity supply network which uses digital communications to detect and react to local changes in electrical usage. Other example uses include for industrial automation and home automation.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of channel access for a first radio device in an asynchronous channel hopping wireless network having at least one target radio device, comprising:

setting a backoff time for frame transmissions from said first radio device, said backoff time comprising an Interference Avoidance Delay (IAD) plus a random backoff time, wherein for an initial one of said frame transmissions, setting an initial value for a number of backoffs (nb) and an initial number for a number of preamble detection backoffs (npdb);

after waiting for an expiring of said backoff time and provided a current value for said npdb <a predetermined maximum npdb value, performing a first clear channel assessment (CCA) on said first radio device's receive (Rx) channel, wherein a value for said npdb is incremented following a failure of said first CCA;

performing a second CCA on said target radio device's Rx channel, wherein a value for said nb is incremented following a failure of said second CCA, and provided a not busy is determined in said second CCA, said first radio device transmitting a frame on said target radio device's Rx channel.

2. The method of claim 1, wherein said first radio device includes a processor having an associated memory, and wherein said first radio device has a channel hopping aware channel access and retransmission algorithm that provides said method which is implemented in hardware including digital logic or is implemented by code in said memory run by said processor.

3. The method of claim 1, wherein said transmitting said frame comprises a retransmission which is delayed by said backoff time using an updated value for said IAD that results in said retransmission being on a different one of said target radio device's Rx channels compared to said target radio device's Rx channel used for a most recent attempt of said transmitting said frame.

4. The method of claim 3, wherein said transmitting said frame comprises said retransmission and wherein said setting comprises setting said IAD to ½ a target dwell time (TDT).

5. The method of claim 1, wherein said failure of said first CCA is handled by setting an updated value for said IAD to a maximum preamble detection time and then returning to said setting said backoff time.

6. The method of claim 1, wherein said failure of said second CCA is handled by setting an updated value for said IAD equal to a maximum of an expected frame transmission time and a target dwell time (TDT) and then returning to said setting said backoff time.

7. The method of claim 1, wherein if said second CCA is successful said first radio device moves to said transmitting said frame, further comprising waiting for an acknowledgement (ACK) from said target radio device and marking said frame for retransmission if said ACK is not received and a current number of retransmission attempts is less than a maximum number of retransmission attempts.

8. The method of claim 3, wherein said transmitting said frame comprises said retransmission and wherein said setting comprises setting an updated value for said IAD equal to a value for a basebackoff time that is equal to a remaining target dwell time (TDT) multiplied by said nb.

9. The method of claim 8, wherein said failure of said second CCA is handled by setting an updated value for said IAD to said value of said basebackoff time multiplied by said nb, and then returning to said setting said backoff time.

10. The method of claim 1, wherein said target radio device comprises a plurality of said target radio devices.

11. A wireless radio device, comprising:
a transceiver coupled to at least one antenna and a real-time clock;
a processor having an associated memory which stores code for implementing a channel hopping aware channel access and retransmission algorithm or hardware including digital logic for implementing said algorithm, said algorithm for:
setting a backoff time for frame transmissions from said radio device, said backoff time comprising an Interference Avoidance Delay (IAD) plus a random backoff time, wherein for an initial one of said frame transmissions, setting an initial number for a number of backoffs (nb) and an initial value for a number of preamble detection backoffs (npdb);

after waiting for an expiring of said backoff time and provided a current value for said npdb <a predetermined maximum npdb value, performing a first clear channel assessment (CCA) on said radio device's receive (Rx) channel, wherein a value for said npdb is incremented following a failure of said first CCA;

performing a second CCA on an Rx channel of a target radio device, wherein a value for said nb is incremented following a failure of said second CCA, and provided a not busy is determined in said second CCA, a first radio device transmitting a frame on said Rx channel of said target radio device.

12. The wireless radio device of claim 11, wherein said radio device has said hardware including said digital logic.

13. The wireless radio device of claim 11, wherein said radio device has said code for implementing said algorithm.

14. The wireless radio device of claim 11, wherein said transmitting said frame comprises a retransmission which is delayed by said backoff time using an updated value for said IAD that results in said retransmission being on a different one of said target radio device's Rx channels compared to said target radio device's Rx channel used for a most recent attempt of said transmitting said frame.

15. The wireless radio device of claim 14, wherein said transmitting said frame comprises said retransmission and wherein said setting comprises setting said IAD to ½ a target dwell time (TDT).

16. The wireless radio device of claim 11, wherein said failure of said first CCA is handled by setting an updated value for said IAD to a maximum preamble detection time and then returning to said setting said backoff time.

17. The wireless radio device of claim 11, wherein said failure of said second CCA is handled by setting an updated value for said IAD equal to a maximum of an expected frame transmission time and a target dwell time (TDT) and then returning to said setting said backoff time.

18. The wireless radio device of claim 11, wherein if said second CCA is successful, said first radio device moves to said transmitting said frame, further comprising waiting for an acknowledgement (ACK) from said target radio device and marking said frame for retransmission if said ACK is not received and a current number of retransmission attempts is less than a maximum number of retransmission attempts.

19. The wireless radio device of claim 14, wherein said transmitting said frame comprises said retransmission and wherein said setting comprises setting an updated value for said IAD equal to a value for a basebackoff time that is equal to a remaining target dwell time (TDT) multiplied by said nb.

20. The wireless radio device of claim 19, wherein said failure of said second CCA is handled by setting an updated value for said IAD to said value of said basebackoff time multiplied by said nb, and then returning to said setting said backoff time.

* * * * *